US010906542B2

(12) United States Patent
Gesch et al.

(10) Patent No.: US 10,906,542 B2
(45) Date of Patent: Feb. 2, 2021

(54) VEHICLE DETECTION SYSTEM WHICH CLASSIFIES VALID OR INVALID VEHICLES (71) Applicants: DENSO International America, Inc., Southfield, MI (US); Denso Corporation, Kariya (JP)

(72) Inventors: Matthew Gesch, Livonia, MI (US); Jin Kurumisawa, Southfield, MI (US); Amy Tibbetts, Detroit, MI (US)

(73) Assignees: DENSO INTERNATIONAL AMERICA, INC., Southfield, MI (US); DENSO CORPORATION

( * ) Notice: Subject to any disclaimer, the term of this patent is extended or adjusted under 35 U.S.C. 154(b) by 263 days.

(21) Appl. No.: 16/018,518

(22) Filed: Jun. 26, 2018

(65) Prior Publication Data
US 2019/0389462 A1   Dec. 26, 2019

(51) Int. Cl.
*B60W 30/16* (2020.01)
*B60W 30/06* (2006.01)
(Continued)

(52) U.S. Cl.
CPC ............ *B60W 30/16* (2013.01); *B60W 30/06* (2013.01); *B60W 30/18163* (2013.01);
(Continued)

(58) Field of Classification Search
CPC . G08G 1/16; G08G 1/166–168; B60W 30/08; B60W 30/095; B60W 50/14;
(Continued)

(56) References Cited

U.S. PATENT DOCUMENTS 5,574,426 A * 11/1996 Shisgal .................. B60Q 9/007
180/271
6,085,151 A * 7/2000 Farmer .................. G01S 7/023
701/301

(Continued)

OTHER PUBLICATIONS

On Road Intelligent Vehicle Path Predication and Clustering using Machine Learning Approach; Shridevi J Kamble ; Manjunath R. Kounte; 2019 Third International conference on I-SMAC (IoT in Social, Mobile, Analytics and Cloud) (I-SMAC); IEEE Conference Paper (Year: 2019).*

(Continued)

*Primary Examiner* — Cuong H Nguyen
(74) *Attorney, Agent, or Firm* — Brooks Kushman P.C.

(57) ABSTRACT

A driving system for a first vehicle, comprising one or more sensors configured to obtain proximity data for two or more vehicles proximate the first vehicle, and a processor in communication with the one or more sensors and programmed to classify the two or more proximate vehicles as a cluster in response to a heading angle of the two or more proximate vehicles being within a threshold-angle tolerance and a distance between each of the two or more proximal vehicles being within a threshold-distance tolerance based on the proximity data, to classify each of the two or more proximate vehicles in the cluster as either a trigger vehicle being closest to the first vehicle or a non-trigger vehicle, and activate a driver assistance function in response to a determination that the trigger vehicle is in an estimated-driving path of the first vehicle.

17 Claims, 4 Drawing Sheets (51) Int. Cl.
*B60W 30/18* (2012.01)
*G06K 9/00* (2006.01)
(52) U.S. Cl.
CPC . *G06K 9/00805* (2013.01); *B60W 2554/4049* (2020.02); *G06K 9/00791* (2013.01)
(58) Field of Classification Search
CPC ................ B60W 30/06; B60W 30/16; B60W 30/18163; B60W 2554/4049; B60Q 9/008
USPC .................. 701/96, 301; 340/436–437, 903; 348/149
See application file for complete search history.

(56) References Cited

U.S. PATENT DOCUMENTS

| | | | | |
|---|---|---|---|---|
| 6,226,571 | B1* | 5/2001 | Kai | G01S 13/931 701/1 |
| 6,898,528 | B2* | 5/2005 | Zorka | G08G 1/163 180/271 |
| 8,768,566 | B2* | 7/2014 | Schwarzhaupt | G08G 1/167 701/36 |
| 8,880,273 | B1* | 11/2014 | Chatham | G08G 1/167 701/28 |
| 2003/0004644 | A1* | 1/2003 | Farmer | G08G 1/165 701/301 |
| 2004/0019425 | A1* | 1/2004 | Zorka | G08G 1/163 701/301 |
| 2004/0167717 | A1* | 8/2004 | Buchanan | B60K 31/0008 701/301 |
| 2012/0191298 | A1* | 7/2012 | Schwarzhaupt | G01S 15/931 701/36 |
| 2012/0330528 | A1* | 12/2012 | Schwindt | G01S 13/52 701/96 |
| 2015/0339923 | A1* | 11/2015 | Konig | H04L 67/12 701/522 |
| 2017/0197549 | A1* | 7/2017 | Vladimerou | B60W 50/14 |
| 2017/0236412 | A1* | 8/2017 | Gross | G08G 1/087 701/301 |
| 2018/0201258 | A1* | 7/2018 | Luo | B60W 10/20 |
| 2019/0384322 | A1* | 12/2019 | Luckevich | B60W 10/06 |

OTHER PUBLICATIONS

A Probabilistic Framework for Tracking the Formation and Evolution of Multi-Vehicle Groups in Public Traffic in the Presence of Observation Uncertainties; Qian Wang ; Beshah Ayalew; IEEE Transactions on Intelligent Transportation Systems; vol. 19, Issue: 2, IEEE Journal Article (Year: 2018).*
Smart real-time traffic congestion estimation and clustering technique for urban vehicular roads; Vishwajeet Pattanaik ; Mayank Singh ; P.K. Gupta ; S.K. Singh; 2016 IEEE Region 10 Conference (TENCON); IEEE Conference Paper. (Year: 2016).*
Discrete-continuous clustering for obstacle detection using stereo vision; Robert Bichsel ; Paulo Vinicius Koerich Borges; 2015 IEEE/RSJ International Conference on Intelligent Robots and Systems (IROS); IEEE Conference Paper. (Year: 2015).*
Motion Pattern Recognition for Maneuver Detection and Trajectory Prediction on Highways; David Augustin ; Marius Hofmann ; Ulrich Konigorski;2018 IEEE International Conference on Vehicular Electronics and Safety (ICVES); IEEE Conference Paper. (Year: 2018).*

* cited by examiner

VEHICLE DETECTION SYSTEM WHICH CLASSIFIES VALID OR INVALID VEHICLES

TECHNICAL FIELD

The present disclosure relates to driver assistance functions related to automobiles.

BACKGROUND

Vehicles may include systems that can detect stationary objects using radar, camera, and other sensors. However, vehicle systems may not be able to distinguish between the various stationary vehicles. Driver assistance functions, such as adaptive cruise control, may need to detect and decelerate against a stationary vehicle in a driving path on a moving vehicle, but at the same time, try to avoid false positives (e.g. a parked vehicle) along a road.

SUMMARY

A first embodiment discloses, a driving system for a first vehicle, comprising one or more sensors configured to obtain proximity data for two or more vehicles proximate the first vehicle, and a processor in communication with the one or more sensors and programmed to classify the two or more proximate vehicles as a cluster in response to a heading angle of the two or more proximate vehicles being within a threshold-angle tolerance and a distance between each of the two or more proximal vehicles being within a threshold-distance tolerance based on the proximity data, classify each of the two or more surrounding vehicles in the cluster as either a trigger vehicle being closest to the first vehicle or a non-trigger vehicle, and activate a driver assistance function in response to a determination that the trigger vehicle is in an estimated-driving path of the first vehicle.

A second embodiment discloses, a vehicle system of a first vehicle comprising one or more sensors configured to obtain proximity data of two or more vehicles proximate the first vehicle. The vehicle system also includes a controller in communication with the one or more sensors and is configured to determine an estimated-driving path of the first vehicle utilizing at least gyroscopic data received from a yaw rate sensor, classify the two or more vehicles as a cluster in response to a heading angle of each of the one or more surrounding vehicles being within a threshold-angle tolerance and a distance between each of the one or more surrounding vehicles being within a threshold-distance tolerance, wherein the processor is further configured to classify only one trigger vehicle in the cluster, wherein the trigger vehicle is a closest vehicle to the moving vehicle within the cluster, and activate a driver assistance function in response to a determination that the trigger vehicle is in the estimated-driving path of the moving vehicle.

A third embodiment discloses, a vehicle system of a moving vehicle comprising one or more sensors configured to identify one or more surrounding vehicles. The vehicle system also includes a processor in communication with the one or more sensors and is configured to classify a first set of the one or more surrounding vehicles as a first cluster in response to a heading angle of each of the first set of the one or more surrounding vehicles and a distance between each of the first set of the one or more surrounding vehicles, classify a second set of the one or more surrounding vehicles as a second cluster, wherein the first set includes a first trigger vehicle and the second set includes a second trigger vehicle, wherein the first trigger vehicle and second trigger vehicle are closest vehicles of the first cluster and second cluster to the moving vehicle, and activate a driver assistance function in response to either the first trigger vehicle or the second trigger vehicle being in an estimated-driving path of the moving vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
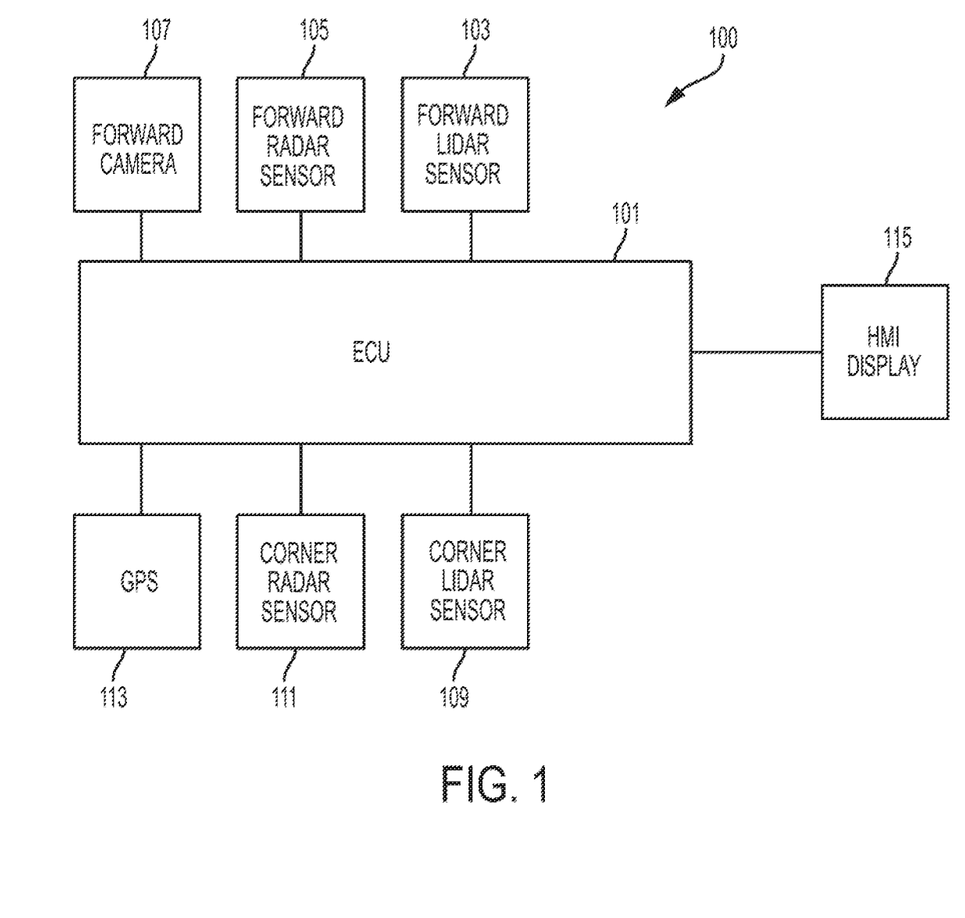
FIG. 1 illustrates a block diagram of a system according to an embodiment of a vehicle described below.

FIG. 1 illustrates an example block diagram of a vehicle system 100. The system 100 may include a controller 101. The controller 101 may be a vehicle controller such as an electronic control unit (ECU). The controller 101, also referred to herein as ECU 101, may be embodied in a processor configured to carry out instructions for the methods and systems described herein. The controller 101 may include a memory (not individually shown in FIG. 1), as well as other components, specifically processing within the vehicle. The controller 101 may be one or more computing devices such as a quad core processor for processing commands, such as a computer processor, microprocessor, or any other device, series of devices or other mechanisms capable of performing the operations discussed herein. The memory may store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. In one example, the memory may include 2 GB DDR3, as well as other removable memory components such as a 128 GB micro SD card.

The controller 101 may be in communication with various sensors, modules, and vehicle systems both within and remote from a vehicle. The system 100 may include such sensors, such as various cameras, a light detection and ranging (LIDAR) sensor, a radar sensor, an ultrasonic sensor, or other sensor for detecting information about the surroundings of the vehicle, including, for example, other vehicles, lane lines, guard rails, objects in the roadway, buildings, pedestrians, etc. In the example shown in FIG. 1, the system 100 may include a forward LIDAR sensor 103, a forward radar sensor 105, a forward camera 107, a corner LIDAR sensor 109, a corner radar sensor 111. FIG. 1 is an example system and the system 100 may include more or less sensors, and sensors of varying types. Further, while the vehicle of FIG. 1 is shown with specific sensors in specific locations for purposes of illustration, the system 100 may be equipped with additional sensors at different locations within or on the vehicle, including additional sensors of the same or different type.

The forward LIDAR sensor 103 and corner LIDAR sensor 109 may each be configured to measure a distance to a target arranged external and proximal to the vehicle by illuminating the target with a pulsed laser light and measuring the reflected pulses with a sensor. The LIDAR sensors 103, 109 may then measure the differences in laser return times. This, along with the received wavelengths, may then be used to generate a digital 3-D representations of the target. The LIDAR sensors 103, 109 may have the ability to classify various objects based on the 3-D rendering of the target. For example, by determining a shape of the target, the LIDAR sensors 103, 109 may classify the target as a vehicle, curb, roadblock, buildings, pedestrian, etc. The LIDAR sensor 103 may work in conjunction with other vehicle components, such as the ECU and other sensors, to classify various targets outside of the vehicle. The LIDAR sensors 103, 109 may include laser emitters, laser receivers, and any other suitable LIDAR autonomous vehicle sensor components. The LIDAR sensors 103, 109 may be arranged within a housing configured to rotate to facilitate scanning of the environment.

As explained, FIG. 1 illustrates the forward LIDAR sensor 103 and the corner LIDAR sensor 109. The forward LIDAR sensor 109 may be used to determine what vehicles and objects are in the front peripheral of the vehicle. The corner LIDAR sensor 109 may also be utilized to detect and classify objects. The corner LIDAR sensor 109 may also be used to enhance a vehicle's peripheral view of the vehicle's surroundings.

The forward radar sensor 105 may be mounted in the front bumper of the vehicle. The corner radar sensor 111 may be mounted in the corner of the bumper. The radar sensors 105, 111 may be configured to detect and classify objects to enhance a vehicle's peripheral view of the vehicle's surroundings. The radar sensors 105, 111 may be utilized to help or enhance various vehicle safety systems. The forward radar sensor 105 may be built into a front bumper of the vehicle to determine that an object is ahead of the vehicle. The corner radar sensor 111 may be located in the rear bumper or the side of the vehicle. The corner radar sensor 111 may be utilized to determine if objects are in a driver's blind spot, as well as detecting vehicles or objects approaching from the rear on the left and right when reversing. Such functionality may allow a driver to navigate around other vehicles when changing lanes or reversing out of a parking space, as well as assist in autonomous emergency braking in order to avoid collisions that may be imminent.

The sensors, including the LIDAR sensors 103, 109 and the radar sensors 105, 111 may be mounted anywhere on the vehicle. For example, it is possible for LIDAR sensor 103 to be mounted on a roof of a vehicle with a 360-degree view of the vehicle's surroundings. Furthermore, the various sensors may surround the vehicle to provide a 360-degree view of the vehicle's surroundings. The vehicle may also be equipped with one or more cameras, one or more LIDAR sensors, one or more radar sensors, one or more ultrasonic sensors, and/or one or more other environmental sensors. Actuators may be utilized to adjust or control an angle of the field of view of the various sensors.

The vehicle system 100 may include at least one forward camera 107. The forward camera 107 may be mounted in the rear-view mirror. The forward camera 107 may also be facing out of the vehicle cabin through a vehicle's windshield to collect imagery data of the environment in front of the vehicle. The forward camera 107 may be utilized to collect information and data regarding the front of the vehicle and for monitoring the conditions ahead of the vehicle. The camera 107 may also be used for imaging the conditions ahead of the vehicle and correctly detecting the positions of lane markers as viewed from the position of the camera and the presence/absence, for example, of lighting of the head lights of oncoming vehicles. For example, the forward camera 107 may be utilized to generate image data related to a vehicle's surroundings such as lane markings ahead, and for other object detection. A vehicle may also be equipped with a rear camera (not shown) for similar circumstances, such as monitoring the vehicle's environment around the rear proximity of the vehicle.

The system 100 may also include a global positioning system (GPS) 113 that detects or determines a current position of the vehicle. In some circumstances, the GPS 113 may be utilized to determine a speed that the vehicle is traveling. The system 100 may also include a vehicle speed sensor (not shown) that detects or determines a current speed that the vehicle is traveling. The system 100 may also include a compass or three-dimensional (3D) gyroscope that detects or determines a current direction of the vehicle. Map data may be stored in the memory. The GPS 113 may update the map data. The map data may include information that may be utilized with an advanced driver assistance system (ADAS). Such ADAS map data information may include detailed lane information, slope information, road curvature data, lane marking-characteristics, etc. Such ADAS map information may be utilized in addition to traditional map data such as road names, road classification, speed limit information, etc. The controller 101 may utilize data from the GPS 113, as well data/information from the gyroscope, vehicle speed sensor, and map data, to determine a location or current position of the vehicle.

The system 100 may also include a human-machine interface (HMI) display 115. The HMI display 115 may include any type of display within a vehicle cabin. Such HMI display may include a dashboard display, navigation display, multimedia display, heads-up display, thin-film transistor liquid-crystal display (TFT LCD), etc. The HMI display 115 may also be connected to speakers to output sound related to commands or the user interface of the vehicle. The HMI display 115 may be utilized to output various commands or information to occupants (e.g. driver or passengers) within the vehicle. For example, in an automatic braking scenario, the HMI display 115 may display a message that the vehicle is prepared to brake and provide feedback to the user regarding the same. The HMI display 115 may utilize any type of monitor or display utilized to display relevant information to the occupants.

In addition to providing visual indications, the HMI display 115 may also be configured to receive user input via a touch-screen, user interface buttons, etc. The HMI display 115 may be configured to receive user commands indicative of various vehicle controls such as audio-visual controls, autonomous vehicle system controls, certain vehicle features, cabin temperature control, etc. The controller 101 may receive such user input and in turn command a relevant vehicle system of the component to perform in accordance with the user input.

The controller 101 can receive information and data from the various vehicle components including the LIDAR sensors 103, 109, the radar sensors 105, 111, the forward camera 107, the GPS 113 and the HMI display 115. The controller 101 utilizes such data to provide vehicle functions that may relate to driver assistance or autonomous driving. For example, data collected by the LIDAR sensors 103, 109 and the forward camera 107 may be utilized in context with the GPS data and map data to provide or enhance functionality related to adaptive cruise control, automatic parking, parking assist, automatic emergency braking (AEB), etc. The controller 101 may be in communication with various systems of the vehicle (e.g. the engine, transmission, brakes, steering mechanism, display, sensors, user interface device, etc.). For example, the controller 101 can be configured to send signals to the brakes to slow the vehicle 100, or the steering mechanism to alter the path of vehicle, or the engine or transmission to accelerate or decelerate the vehicle. The controller 101 can be configured to receive input signals from the various vehicle sensors to send output signals to the display device, for example. The controller 101 may also be in communication with one or more databases, memory, the internet, or networks for accessing additional information (e.g. maps, road information, weather, vehicle information).

Figure 2A:
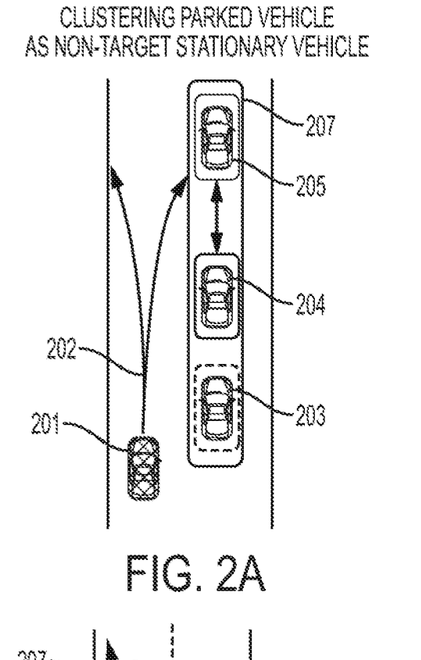
FIG. 2a is an example of a first scenario with parked vehicles along a straight road.

FIG. 2A is an example of a first scenario with parked vehicles along a straight road. A straight road may have a scenario of parked vehicles alongside the road. A typical vehicle system may detect a stationary vehicle in an adjacent lane due to a yaw rate signal fluctuation or a steering motion. The system may estimate the driving path using a yaw rate signal. Thus, if the vehicle moves left and right within the lane, that causes a yaw rate fluctuation. Thus, there may be a false-positive scenario of activation of an ADAS command (e.g. autobraking, collision warning, etc.) when the vehicle is moving in a straight path.

A valid stationary vehicle 203 may be the closest vehicle to the driving vehicle 201. Because the valid stationary vehicle 203 is the closest to the driving vehicle 201, it may be classified as a valid stationary vehicle. However, the estimated driving path 202 of the driving vehicle 201 may be off due to fluctuations of the yaw rate. Thus, the driving vehicle 201 may be equipped with ADAS functionality (e.g. autonomous braking) that may be activated because it assumes the driving vehicle 201 may collide with a parked vehicle 205. Both vehicles 204 and 205 may be classified as invalid vehicles. The vehicle system may evaluate the distance between vehicle 204 and vehicle 205, as well as the distance between vehicle 203 and vehicle 204. If the vehicle distance between the three vehicles are relatively close, the vehicles may be grouped as a clustered stationary vehicle.

The vehicle may utilize a processor to identify a cluster 207 of stationary vehicles. The cluster of vehicles may be stationary vehicles that have similar trajectories and may be relatively close to each other. An algorithm may be utilized that gives different weights for the different attributes that are utilized to identify a cluster 207 of vehicles. For example, in one scenario, the processor may provide more weight to the heading angle of the stationary vehicles than it would the distance between the stationary vehicles. In another scenario, the processor may provide more weight to the distance between the stationary vehicles than the heading angle of the stationary vehicles.

In a scenario when the surrounding vehicles proximate to the moving vehicle are not clustered and identified as either valid vehicles 203 (e.g. trigger vehicles or target vehicles) or invalid vehicles 204, 205 (e.g. non-trigger vehicles), the system may detect a stationary vehicle in the adjacent lane due to a yaw rate signal fluctuation or a steering motion. The moving vehicle may use the yaw rate signals to estimate the driving path 202. Because the estimated driving path may be towards a non-target/invalid vehicle, the processor may not activate an ADAS function. However, if the moving vehicle 201 has an estimated driving path 202 towards the valid, stationary vehicle (e.g. trigger vehicle/target vehicle), an ADAS function may be activated.

Figure 2B:
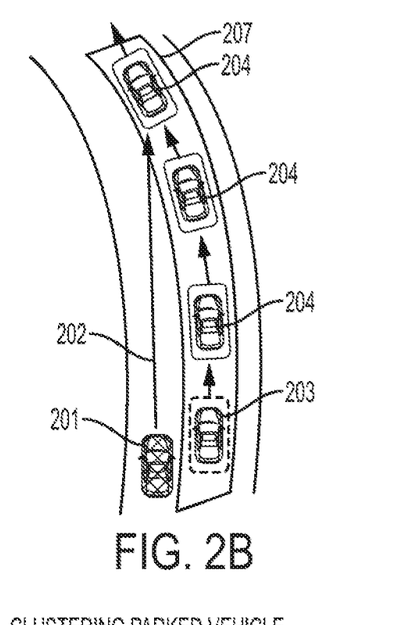
FIG. 2b is an example of a second scene with vehicles stationary along a curved path.

FIG. 2B is an example of a second scene with vehicles stationary along a curved path. A curved road may have a scenario of parked vehicles alongside the road. A typical vehicle system may detect a stationary vehicle in an adjacent lane being in the estimated driving path 202 of the driving vehicle 201 before the driving vehicle 201 begins to turn along the road. However, this stationary vehicle 204 may not be a vehicle that should trigger activation of an ADAS function since the road is curved, as the driving vehicle 201 has not yet adjusted to its maneuvering to accommodate the curved road, and may not drive straight into that stationary vehicle. Regardless, the adaptive cruise control system of the driving vehicle 201 may detect the stationary vehicle 204 in the adjacent lane.

A valid stationary vehicle 203 may be the closest vehicle to the driving vehicle 201. Because the valid stationery vehicle 203 (e.g. trigger vehicle) is the closest to the driving vehicle 201, it may be classified as a valid stationary vehicle. However, the estimated driving path 202 of the driving vehicle 201 may be inaccurate because the steering angle of the driving vehicle 201 has not changed to accommodate for the winding road. Thus, the driving vehicle 201 may be equipped with ADAS functionality (e.g. adaptive cruise control) that may typically be activated because it assumes the driving vehicle 201 may collide with a parked vehicle 205. Both vehicles may be classified as invalid vehicles 204. The vehicle system may evaluate the distance between the invalid vehicles 204, as well as the distance between the valid vehicle 203 and invalid vehicle 204 ahead of the valid vehicle, along with all of the vehicles of the cluster 207. If the vehicle distance between the vehicles are relatively close, the vehicles may be grouped as a clustered stationary vehicle. After the vehicles are grouped as being within a cluster 207, the driving vehicle 201 may then determine which vehicles are valid 203 (e.g. trigger vehicles) or invalid vehicles 204 (e.g. non-trigger vehicles). The driving vehicle 201 may be configured to only activate an ADAS function when the valid vehicle 203 is in its estimated driving path 202.

Figure 2C:
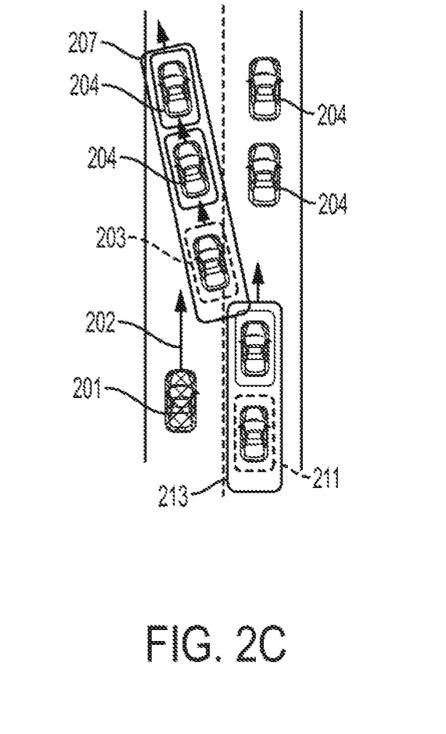
FIG. 2c is an example of a third scene having traffic jam situation.

FIG. 2C is an example of a traffic jam situation. In such a scenario, the driving vehicle 201 may identify a first cluster 207 and second cluster 213. The first cluster 207 may have multiple vehicles within the cluster, including both valid vehicles 203 (e.g. trigger vehicles) or invalid vehicles 204 (e.g. non-trigger vehicles). The valid vehicle of the first cluster 207 may be classified as the rear end vehicle 203 (e.g. closest to the driving vehicle 201) of the clustered vehicles, as those vehicles within a cluster 207 may all have a similar heading angle. Other vehicles may be surrounding the driving vehicle but may not be detected by the various sensors of the vehicle, for example a group of vehicles are outside of a cluster because they are not identifiable, as the sensors of the vehicles cannot detect them. Both of the valid vehicles 203, 213 may be capable of activating an ADAS function if either of the valid vehicles 203, 213 are in an estimated driving path 202 of the moving vehicle.

Figure 2D:
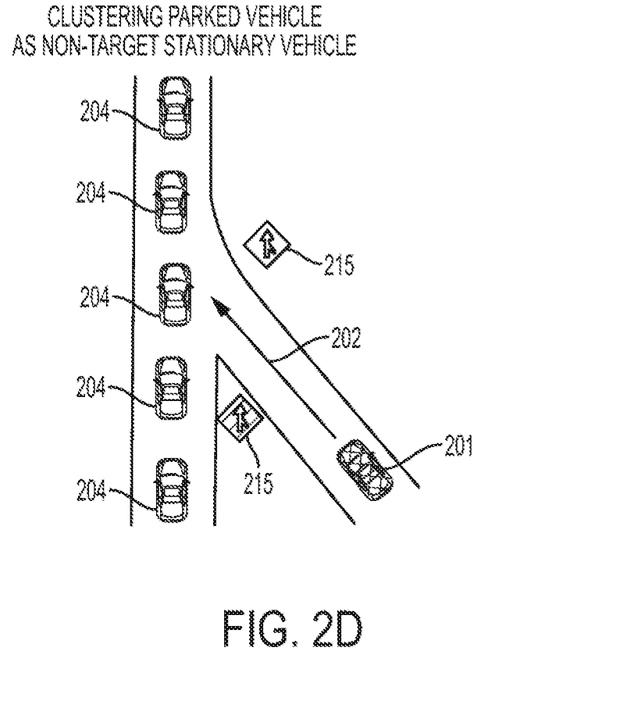
FIG. 2d is an example of a fourth scene of a highway merger situation.

FIG. 2D is an example of highway merger situation. In FIG. 2D, the vehicles 204 that surround the moving vehicle 201 that are in the cluster may be an exception to classification of vehicles in the cluster. The moving vehicle may recognize a highway merger scenario by utilizing the exterior cameras, as well as GPS data (e.g. location data and map data). When the moving vehicle is merging onto a freeway with a group of stationary vehicles or slow-moving vehicles, the moving vehicle may have an estimated driving path towards the group of clustered parked vehicles. The moving vehicle's camera may be able to read a traffic sign 215 or recognize the merger situation from the driving lane recognition functionality of the vehicle. In such a scenario, the vehicle may not cluster the vehicles although it may detect a stationary vehicle in the driving path 202. Thus, because the vehicle may identify a merge scenario, it may not activate an ADAS function in view of a vehicle 204 being in the estimated driving path 202 of the moving vehicle 201.

Figure 3:
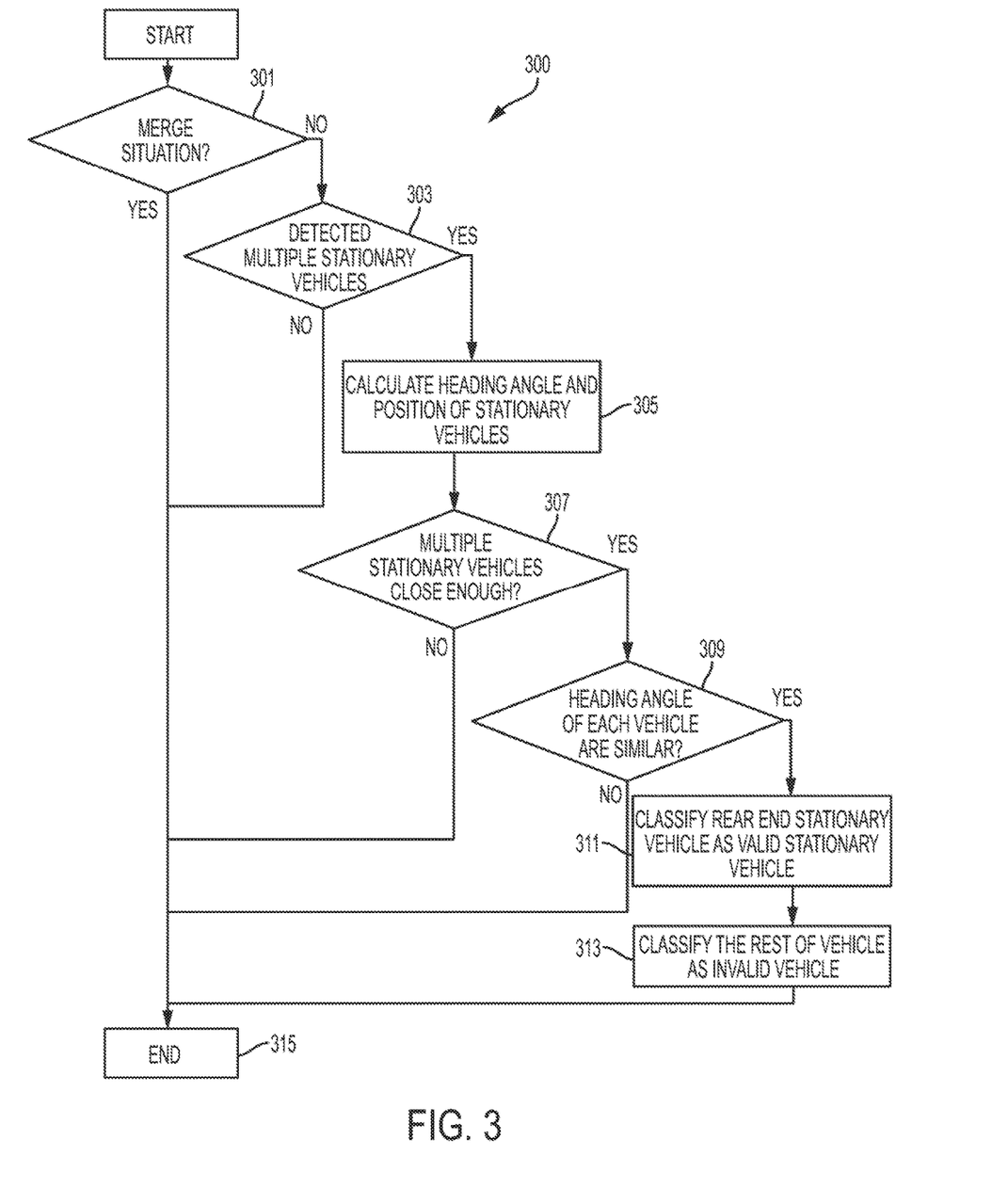
FIG. 3 is an example of a flowchart utilized to classify one or more target vehicles surrounding an occupant in an automobile.

FIG. 3 is an example of a flowchart utilized to classify one or more target vehicles surrounding an occupant in an automobile. The flow chart 300 may be utilized in the processor, ECU, or controller described in FIG. 1. The vehicle may be monitoring the surroundings of the vehicle environment for various situations. Specifically, the vehicle or ECU may be monitoring for a merge scenario 301 where the vehicle will be driving into a traffic lane where multiple vehicles are stationary or driving slow and the number of traffic lanes is being reduced. The vehicle may need to brake in order to avoid an accident with the vehicles in the merging lane. In another scenario, the vehicle may need to accelerate in between a space between the surrounding vehicles in the merging lane to allow the vehicle to enter the merging lane. One scenario of a merger situation is shown in FIG. 2D above. If the processor determines that the vehicle is in a merger situation, it may end 315 the determination if the vehicles are valid or invalid and continue as normal. At 315, the vehicle may proceed in a normal operation state where the system may continue operating the vehicle in a non-assistance drive state in response to a determination that the non-trigger vehicle is in the estimated-driving path of the moving vehicle. If a merger situation is not found, the processor may continue to determine if the surround vehicles should be classified as valid or invalid.

The vehicle system may utilize various sensors and vehicle components to determine an emergency situation (e.g. brake scenario, slow down, emergency brake, steering control, lane assist, etc.). The system may first utilize a yaw-rate sensor to determine a vehicle's angular velocity. The system may also utilize lane markings or other road information. Next, the vehicle system may determine the preceding vehicle's path. The vehicle may also evaluate the driving vehicle's preceding path as well as an estimated path. The system may look at roadside objects as well. In other embodiments, the vehicle system may utilize GPS data and vehicle-to-vehicle communication for identifying an emergency scenario.

At step 303, a processor may be utilized to determine if multiple stationary vehicles are detected. Thus, the processor may utilize vehicle cameras or LIDAR sensors to detect objects. In turn, the driving vehicle may be utilized to determine if there are any stationary vehicles surrounding the driving vehicle. The stationary vehicles may later be grouped in a cluster and classified.

At step 305, the processor may calculate the heading angle and position of all the stationary vehicles. This may be done utilizing the cameras and/or LIDAR sensors that the vehicle is equipped with. The processor may output the heading angle and positional fusion velocity of the stationary vehicles to be utilized in determining if the vehicles are classified as valid or invalid. The heading angle and velocity of the surrounding vehicles may be utilized.

At step 307, the processor may determine if multiple stationary vehicles are located close enough. The vehicle processor may utilize various vehicle sensors to determine a distance that is defined between a cluster of vehicles. There may be a threshold distance between a vehicle that will define whether the vehicle is part of the cluster. If the processor determines that the stationary vehicles are not close enough (e.g. the distance between the vehicles is above the threshold distance), it may end 315 the determination if the vehicles are valid or invalid and continue as normal. If the processor determines that the stationary vehicles are close enough (e.g. the distance between the vehicles is below the threshold distance), it may continue to determine if the vehicles are valid or invalid and continue as normal. A threshold-distance tolerance between each of the surrounding vehicles may define if the surrounding vehicles distance is close enough to be within a cluster.

At step 309, the processor may evaluate the heading angle of each surrounding vehicle. In other words, the processor may utilize sensors to collect information about each vehicle to determine the trajectory or heading angle of the surrounding vehicles. If the processor or controller determines that the stationary vehicles each have different trajectories (e.g. the angle of the trajectory between the vehicles is outside of a predefined tolerance), it may end 315 the determination if the vehicles are valid or invalid and continue as normal. If the processor determines that the stationary vehicles each have similar trajectories (e.g. the angle of the trajectory between the vehicles is within of a predefined tolerance), it may continue on with the determination of whether the vehicles are valid or invalid and continue as normal. A threshold-angle tolerance between each of surrounding vehicles may define if the surrounding vehicles heading angle is similar enough to be within a cluster.

At step 311, the processor may classify the rear end stationary vehicles as a valid stationary vehicle in response to the determination that the stationary vehicles each have similar trajectories. The processor may utilize the various vehicle sensors (e.g. LIDAR, camera, radar, etc.) to determine which vehicle is the rear vehicle and determine a distance of the rear end of that vehicle. That rear most vehicle of the cluster, or the surrounding vehicle closest to the driven vehicle, may then be classified as a valid stationary vehicle. If the vehicle is considered a valid vehicle, it may activate an ADAS function or driver assistance feature. Additionally, the processor (e.g. ADAS controller) may have internal logic how to control and classify each vehicle for activation of such commands.

At step 313, the processor may classify the other vehicles (e.g. other vehicles besides the rear stationary vehicle) as invalid vehicles or non-trigger vehicles. The processor may utilize data fusion and image recognition to identify the other vehicles that are not nearest to the driven vehicle. After determining which vehicle is either valid (e.g. trigger vehicle) or non-valid (e.g. non-trigger vehicle), the moving vehicle may be configured to activate ADAS functions for valid vehicles when the trigger vehicle is in an estimated driving path of the moving vehicle. On the other hand, the moving vehicle may be configured to not activate ADAS functions when invalid vehicles are in an estimated driving path of the moving vehicle.

Figure 4:
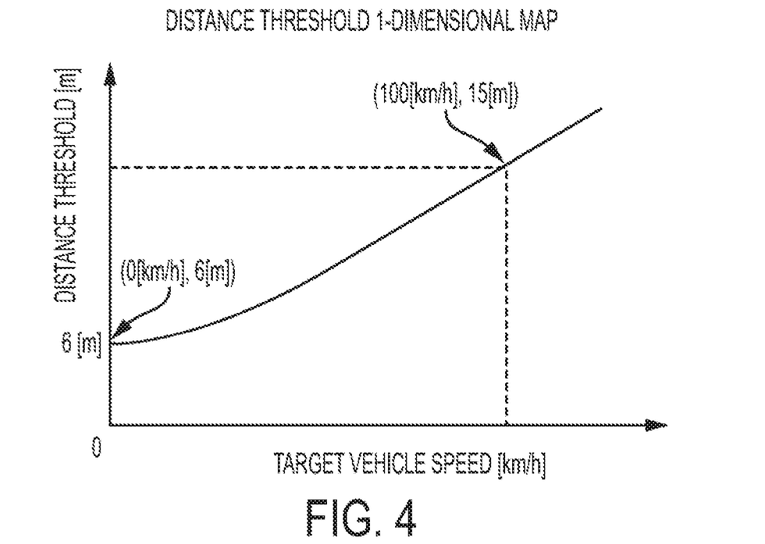
FIG. 4 is an example of a graph showing the target vehicle speed against a distance threshold.

FIG. 4 is an example of a graph showing the target vehicle speed against a distance threshold, or a distance threshold one-dimensional map. A distance threshold can be calculated based on each target vehicle's velocity (e.g. valid vehicle's speed). Because a target vehicle may be stationary, the subject vehicle/moving vehicle may be able to cut ahead of the target vehicle if there is clearance (e.g. 8 meters) between the target vehicle and the vehicle ahead of the target vehicle. As the speed of the target vehicle increases, the clearance may increase in order to cut ahead of the target vehicle. The distance threshold can be calculated utilizing a one-dimensional map or a look up table stored in memory, e.g. shown in FIG. 4. As shown in FIG. 4, the y-axis is a distance threshold (in meters). The x-axis is a vehicle speed (e.g. in km/h) of the target vehicle. As shown on the graph, at a vehicle speed of 0 km/h, the distance threshold may be 6 meters. However, at a vehicle speed of 100 km/h, the distance threshold may increase to 15 meters. The distance thresholds shown in FIG. 4 may vary and are only examples.

Figure 5:
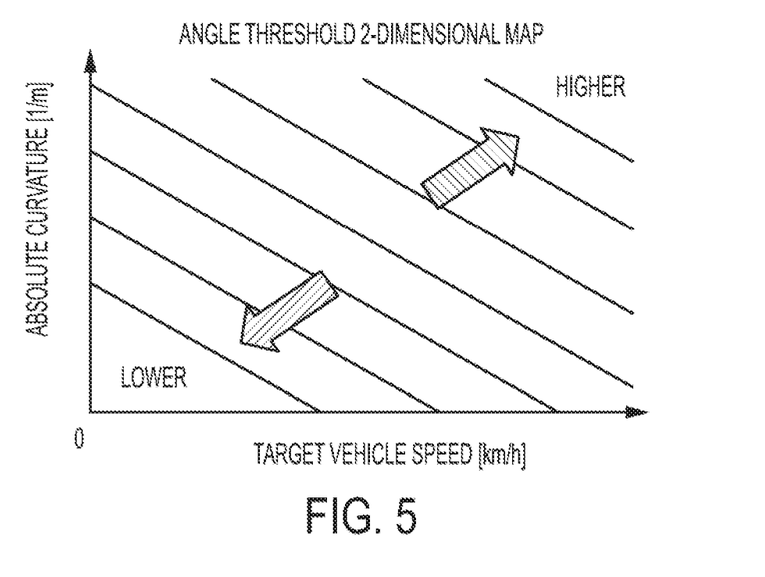
FIG. 5 is an example of a graph comparing target vehicle speed against absolute curvature.

FIG. 5 is an example of a two-dimensional graph comparing target vehicle speed against absolute curvature. An angle threshold can be calculated utilizing the 2-dimensional map shown in FIG. 5. At the y-axis is an absolute curvature. The x-axis is the vehicle speed of the target vehicle (e.g. in km/h). If the road curvature is zero (e.g. the road is relatively straight), and the vehicle speed of the target vehicle is low or stationary, then the heading angle should be almost the same between the target vehicle and the vehicle ahead of the target vehicle. On the other hand, if the road curvature is high (e.g. curved road), and the target vehicle speed is high (e.g. 100 km/h or more), then the heading angle difference between the target vehicle and the vehicle ahead of the target vehicle (non-target vehicle) will be higher. Thus, the angle threshold may be set higher in such a scenario. Road curvature may be estimated utilizing speed (e.g. from a speed sensor), yaw rate, or lane marker detection results.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A driving system for a first vehicle, comprising:
one or more sensors configured to obtain proximity data for two or more vehicles proximate the first vehicle; and
a processor in communication with the one or more sensors and programmed to:
(i) classify the two or more proximate vehicles as a cluster in response to a heading angle of the two or more proximate vehicles being within a threshold-angle tolerance and a distance between each of the two or more proximal vehicles being within a threshold-distance tolerance based on the proximity data, wherein the cluster includes two or more proximate vehicles;
(ii) classify each of the two or more proximate vehicles in the cluster as either a trigger vehicle being closest to the first vehicle or a non-trigger vehicle not being closest to the first vehicle; and
(iii) activate a driver assistance function in response to a determination that the trigger vehicle is in an estimated-driving path of the first vehicle.

2. The driving system of claim 1, wherein the processor is further programmed to continue operating the first vehicle in a drive non-assistance state in response to a determination that the non-trigger vehicle is in the estimated-driving path of the first vehicle.

3. The driving system of claim 1, wherein the processor is further programmed to determine the estimated-driving path of the first vehicle utilizing a vehicle speed sensor and yaw rate sensor.

4. The driving system of claim 1, wherein the processor is further programmed to output an alert on a display of the vehicle system in response to activation of the driver assistance function.

5. The driving system of claim 1, wherein the processor is further programmed to identify a merge scenario of the first vehicle based on the proximity data.

6. The driving system of claim 1, wherein the processor is further programmed to identify a plurality of clusters based on the proximity data.

7. The driving system of claim 1, wherein the processor is further programmed to classify the two or more proximate vehicles in response to a yaw rate fluctuation of the estimated-driving path of the first vehicle.

8. The driving system of claim 1, wherein the two or more proximate vehicles are stationary vehicles.

9. The driving system of claim 1, wherein the two or more proximate vehicles are traveling less than 10 miles per hour.

10. A vehicle system of a first vehicle, comprising:
one or more sensors configured to obtain proximity data of two or more vehicles proximate the first vehicle; and
a controller in communication with the one or more sensors and configured to:
(i) determine an estimated-driving path of the first vehicle utilizing at least a gyroscopic data received from a yaw rate sensor;
(ii) classify the two or more vehicles as a cluster in response to a heading angle of each of the two or more vehicles being within a threshold-angle tolerance and a distance between each of the two or more vehicles being within a threshold-distance tolerance, wherein the controller is further configured to classify only one trigger vehicle in the cluster, wherein the trigger vehicle is a closest vehicle to the first vehicle within the cluster, wherein the cluster includes two or more vehicles, and (iii) activate a driver assistance function in response to a determination that the trigger vehicle is in the estimated-driving path of the first vehicle.

11. The vehicle system of claim 10, wherein other proximate vehicles in the cluster are classified as non-trigger vehicles, wherein the controller is further configured to continue operating the first vehicle in a non-assistance drive state in response to a determination that the non-trigger vehicle is in the estimated-driving path of the first vehicle.

12. The vehicle system of claim 11, wherein the non-trigger vehicles are not closest to the first vehicle in comparison to each of the two or more vehicles in the cluster.

13. The vehicle system of claim 10, wherein the controller is further configured to classify only one trigger vehicle in the cluster to a non-trigger vehicle in response to the controller identifying a highway merging scenario.

14. The vehicle system of claim 10, wherein the controller is an advanced driver assistance controller configured to activate driver assistance functions.

15. The vehicle system of claim 10, wherein the controller is further configured to identify a plurality of clusters that each include trigger vehicles.

16. The vehicle system of claim 10, wherein the two or more vehicles in the cluster are driving less than 10 miles per hour.

17. The vehicle system of claim 10, wherein the two or more vehicles in the cluster are stationary.

* * * * *